United States Patent
Pottebaum et al.

(10) Patent No.: US 7,310,199 B2
(45) Date of Patent: Dec. 18, 2007

(54) WINDAGE PLATE WITH SNUBBER MEMBER TO LIMIT MECHANICAL DEFLECTION

(75) Inventors: Kenneth Lee Pottebaum, Lakeville, MN (US); Jackson Wagner Nichols, Belle Plaine, MN (US); Robert Allen Alt, Niwot, CO (US)

(73) Assignee: Seagate Technology, LLC, Scotts Valley, CA (US)

( * ) Notice: Subject to any disclaimer, the term of this patent is extended or adjusted under 35 U.S.C. 154(b) by 378 days.

(21) Appl. No.: 10/862,672

(22) Filed: Jun. 7, 2004

(65) Prior Publication Data

US 2005/0270691 A1 Dec. 8, 2005

(51) Int. Cl.
*G11B 33/14* (2006.01)
(52) U.S. Cl. .................................... 360/97.02
(58) Field of Classification Search ... 360/97.01–97.04
See application file for complete search history.

(56) References Cited

U.S. PATENT DOCUMENTS

| | | | |
|---|---|---|---|
| 6,172,843 B1 * | 1/2001 | Genheimer et al. | 360/97.01 |
| 6,226,144 B1 * | 5/2001 | Nagl et al. | 360/97.01 |
| 6,236,531 B1 | 5/2001 | Allsup | |
| 6,271,987 B1 | 8/2001 | Allsup | |
| 6,424,487 B2 * | 7/2002 | Nagl et al. | 360/97.01 |
| 6,477,000 B1 | 11/2002 | Pottebaum | |
| 6,496,327 B2 | 12/2002 | Xia | |
| 6,542,328 B2 | 4/2003 | Harrison | |
| 2003/0179493 A1 * | 9/2003 | Kim | 360/97.02 |

FOREIGN PATENT DOCUMENTS

KR    1020030086197 A    * 11/2003

* cited by examiner

*Primary Examiner*—Allen Cao
(74) *Attorney, Agent, or Firm*—Shumaker & Sieffert, PA

(57) ABSTRACT

An apparatus which provides improved fluidic control includes a circumferentially extending windage plate adapted for placement adjacent a rotatable disc surface. The plate operates to direct fluidic currents established by rotation of the surface. One or more snubber members are supported by the plate to prevent localized contact between the plate and the surface as a result of deflection induced by application of a mechanical shock. Preferably, an access element is moveable along a movement path adjacent the rotatable surface. An air dam comprising a localized increased thickness portion of the plate at a leading or trailing edge of the plate preferably further directs the fluidic flow, and the snubber member-further prevents contact between the air dam and the rotatable surface. The rotatable surface preferably comprises a data recording surface and the access element preferably comprises a data transducing head.

20 Claims, 5 Drawing Sheets

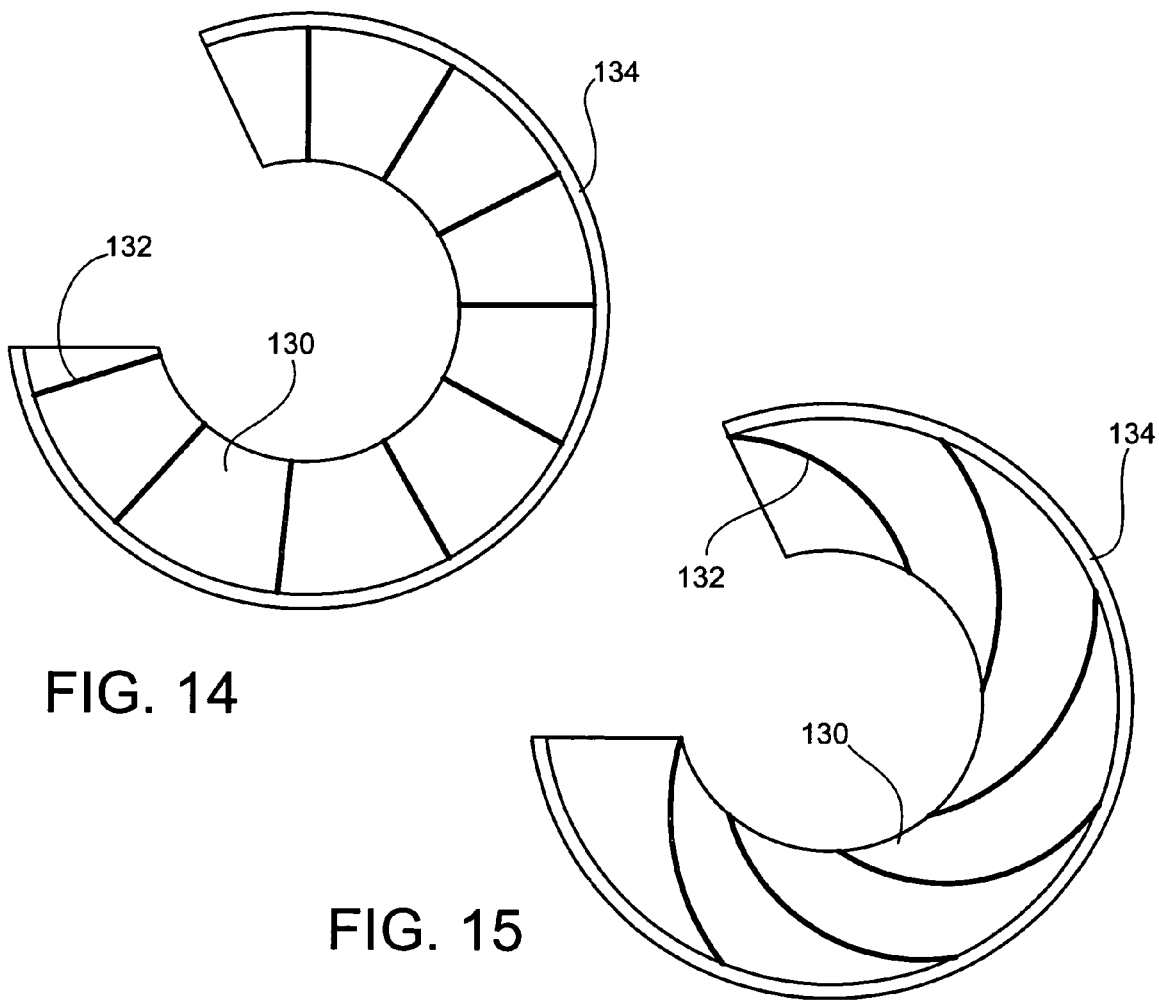
FIG. 14
FIG. 15
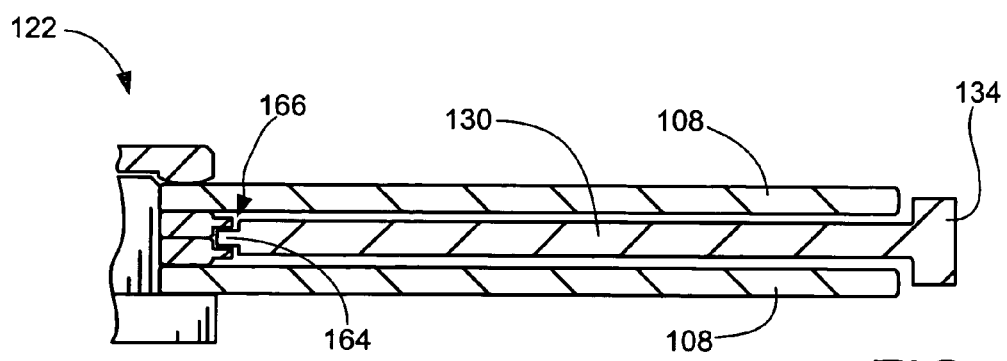
FIG. 16

WINDAGE PLATE WITH SNUBBER MEMBER TO LIMIT MECHANICAL DEFLECTION

FIELD OF THE INVENTION

The claimed invention relates generally to the field of fluidic control devices and more particularly, but not by way of limitation, to a windage plate which directs fluidic currents established by rotation of an adjacent surface, such as a recording surface in a data storage.

BACKGROUND

Digital data storage devices are used to store and retrieve large amounts of user data in a fast and efficient manner. A typical data storage device uses an actuator assembly to support an array of vertically aligned data transducing heads adjacent recording surfaces in a disc stack.

The disc stack is rotated at a relatively high rotational velocity by a spindle motor. An actuator motor (such as a voice coil motor, VCM) pivots the actuator assembly to align the transducers with data tracks defined on the recording surfaces to write data to the tracks and retrieve previously written data from the tracks. The heads are typically hydrodynamically supported adjacent the recording surfaces by fluidic currents established by rotation of the disc stack.

A continuing trend in the industry is to provide successive generations of data storage devices with smaller sizes and increased storage capacities and data transfer rates. There is therefore a continued need for improved fluidic control configurations in data storage devices as well as in other applications, and it is to such improvements that the claimed invention is generally directed.

SUMMARY OF THE INVENTION

In accordance with some preferred embodiments, an apparatus is provided comprising a circumferentially extending windage plate adapted for placement adjacent a rotatable disc surface. The plate operates to direct fluidic currents established by rotation of said surface.

A snubber member is supported by the plate to prevent localized contact between the plate and the surface as a result of deflection induced by application of a mechanical shock.

In other preferred embodiments, the apparatus comprises an access element moveable along a movement path adjacent a rotatable surface. A circumferentially extending windage plate operates to direct fluidic currents established by rotation of said surface. As before, a snubber member supported by the plate prevents localized contact between the plate and the surface upon deflection thereof in response to application of a mechanical shock.

Preferably, the rotatable surface comprises a data recording surface and the access element comprises a data transducing head. The plate preferably includes a leading edge and a trailing edge which cooperate to define an access opening for the access element. An air dam comprising a localized increased thickness portion of the plate at a leading or trailing edge of the plate preferably further directs the fluidic flow, and the snubber member further prevents contact between the air dam and the rotatable surface.

These and various other features and advantages that characterize the claimed invention will be apparent upon reading the following detailed description and upon review of the associated drawings.

BRIEF DESCRIPTION OF THE DRAWINGS

FIGS. 14 and 15 illustrate yet further alternative windage plates with snubber members characterized as radially extending ridges, or flanges.

FIG. 16 illustrates another windage plate with an inwardly projecting protrusion which engages a channel to prevent contact between the plate and the discs near the ID of the discs.

DETAILED DESCRIPTION

Figure 1:
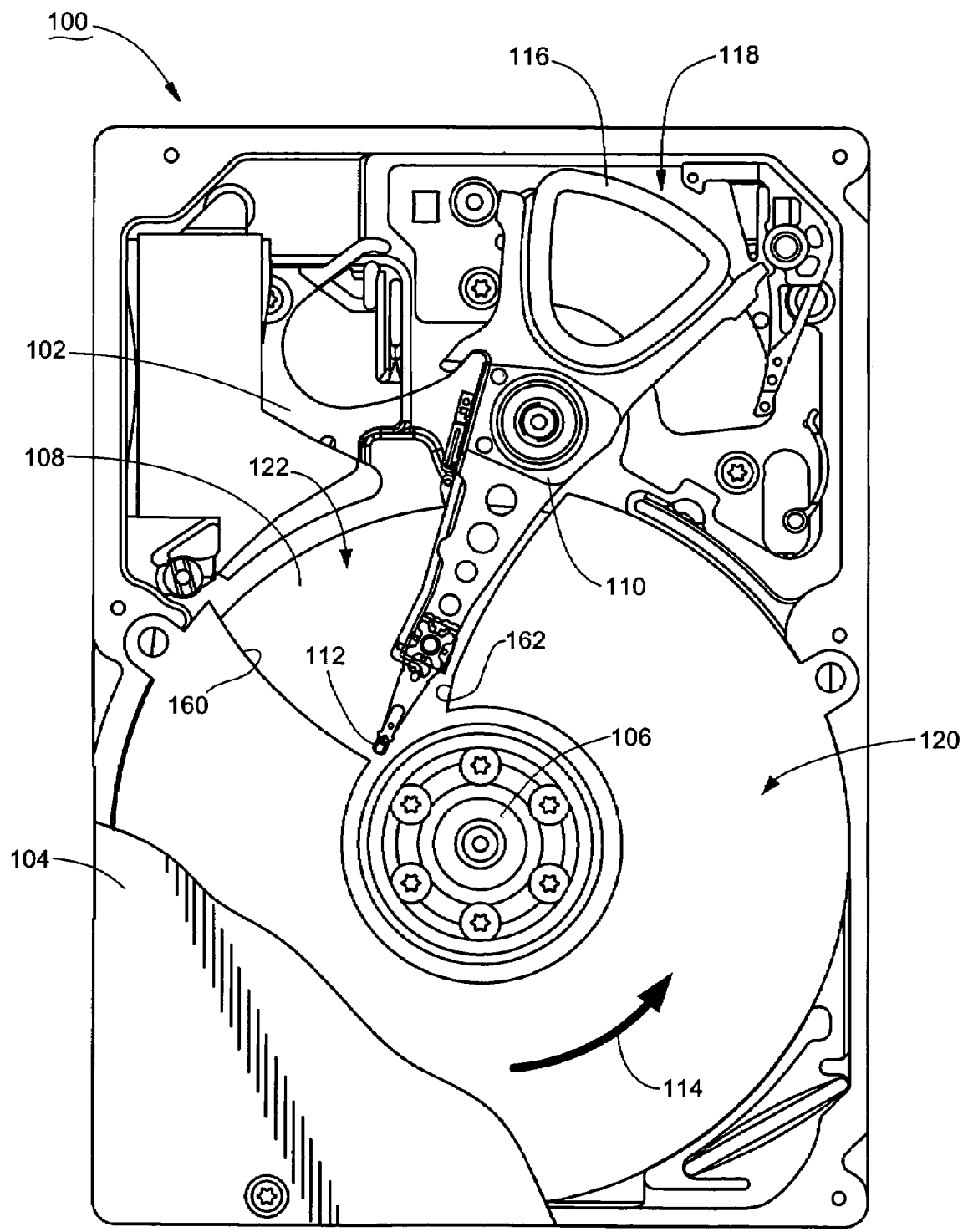
FIG. 1 is top plan view of a data storage device having a fluidic control assembly constructed in accordance with preferred embodiments of the present invention to control fluidic currents established by rotation of a disc assembly of the device.

While the claimed invention has utility in any number of different applications, FIG. 1 has been provided to illustrate a particularly suitable environment in which the claimed invention can be advantageously practiced.

FIG. 1 provides a top plan view of a data storage device 100 of the type configured to magnetically store and transfer digital data with a host device. The device 100 includes a base deck 102 which mates with a top cover 104 (shown in partial cut-away) to form a sealed housing.

A spindle motor 106 rotates a number of axially aligned, magnetic recording discs 108 at a constant high speed. An actuator assembly 110 supports a corresponding array of data transducing heads 112.

During operation, the heads 112 are hydrodynamically supported adjacent the disc surfaces by fluidic (air) currents 114 established by the high speed rotation of the discs 108. The currents 114 generally circulate along the direction of rotation of the discs 108 (in this case, counter-clockwise as depicted in FIG. 1).

Application of current to a coil 116 of a voice coil motor (VCM) 118 pivots the actuator assembly 110, thereby causing the heads 112 to move radially across the disc surfaces to access data tracks (not shown) defined thereon.

Figure 2:
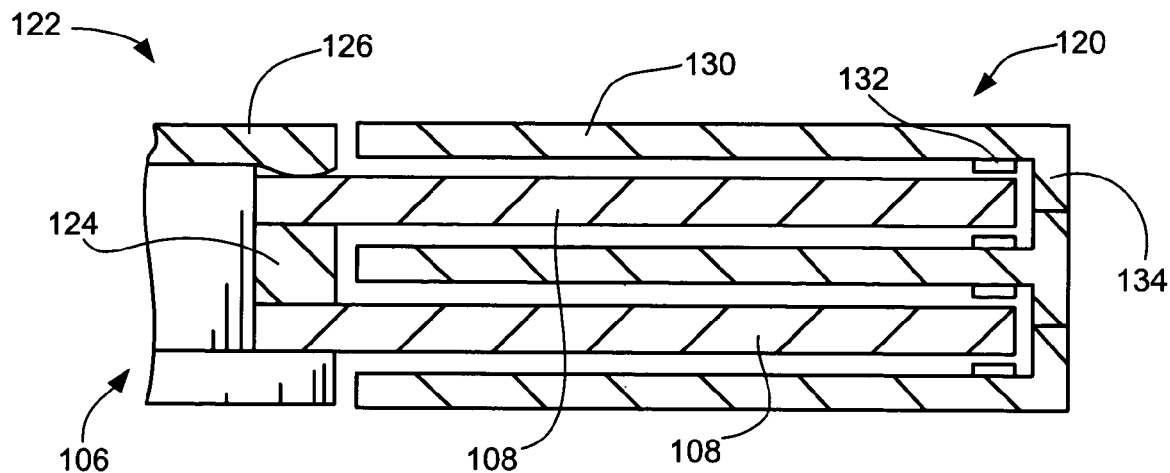
FIG. 2 is a cross-sectional, elevational view of the fluidic control assembly and disc assembly of FIG. 1 to illustrate snubber members used to limit deflection in response to application of a mechanical shock to the device.

A fluidic control assembly 120 directs the fluidic currents established by the high speed rotation of the discs 108. As shown in FIG. 2, the fluidic control assembly 120 is meshed with a disc stack 122 formed from the aforementioned spindle motor 106 and discs 108. In the present example the disc assembly 122 includes two (2) discs 108 separated by an intervening spacer 124 and a disc clamp 126 which applies a clamping force to secure the discs and spacer to a hub of the spindle motor 106. Other respective numbers of discs and spacers can be utilized as desired.

The fluidic control assembly 120 preferably includes a plurality of stationary, circumferentially extending windage plates 130, also referred to herein as disc separator plates. Although three (3) plates 130 are shown in the illustrative embodiment of FIG. 2, other numbers of plates can be used including just a single plate disposed between the discs 108, as desired.

A number of snubber members 132 are supported by the associated plates 130. The snubber members 132 operate to prevent localized contact between the discs 108 and the plates 130 upon deflection thereof in response to the application of a mechanical shock to the device 100. Optional shroud members 134 preferably extend from the plates 130 as shown to provide inwardly facing shroud surfaces that circumferentially extend adjacent the outermost perimeters of the discs 108 to further direct the fluidic currents 114.

Figure 3:
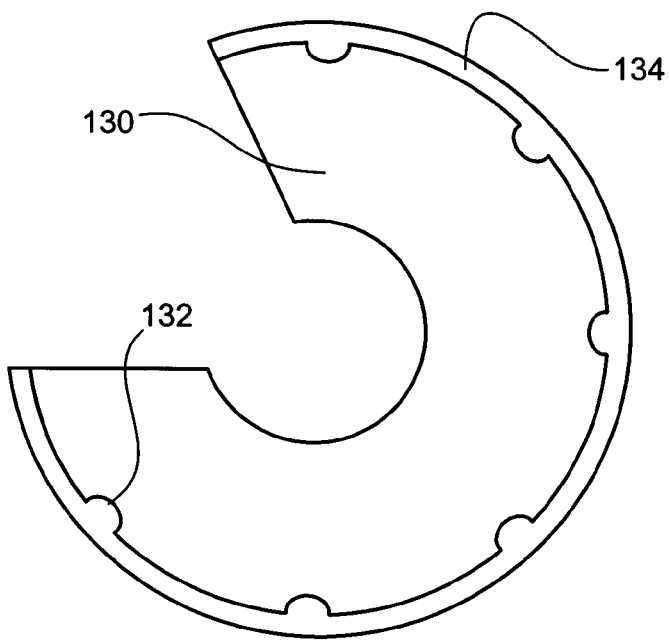
FIG. 3 is a top plan view of a windage plate of the fluidic control assembly in accordance with some preferred embodiments.
Figure 4:
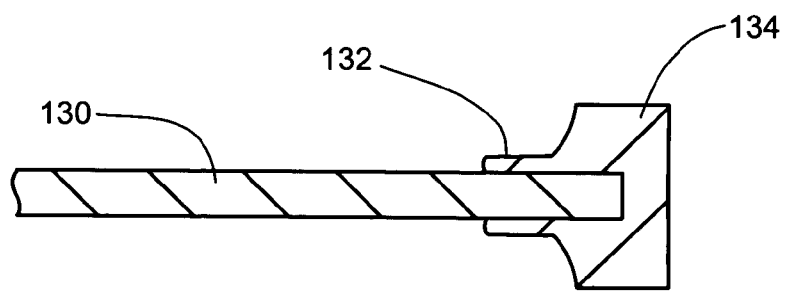
FIG. 4 is a cross-sectional, side elevational view of the plate of FIG. 3.

FIGS. 3 and 4 illustrate a selected plate 130 that is overmolded with a suitable material to form the snubber members 132 and shroud members 134. The plate 130 is preferably formed of a suitable rigid material, such as aluminum or stainless steel, and the overmold material preferably comprises a low particulating, moldable material such as an elastomer or polycarbonate resin. The plate 130 can also be molded as well. In these embodiments, the snubber members 132 preferably extend inwardly to form a sequence of pads, as shown in FIG. 3.

Figure 5:
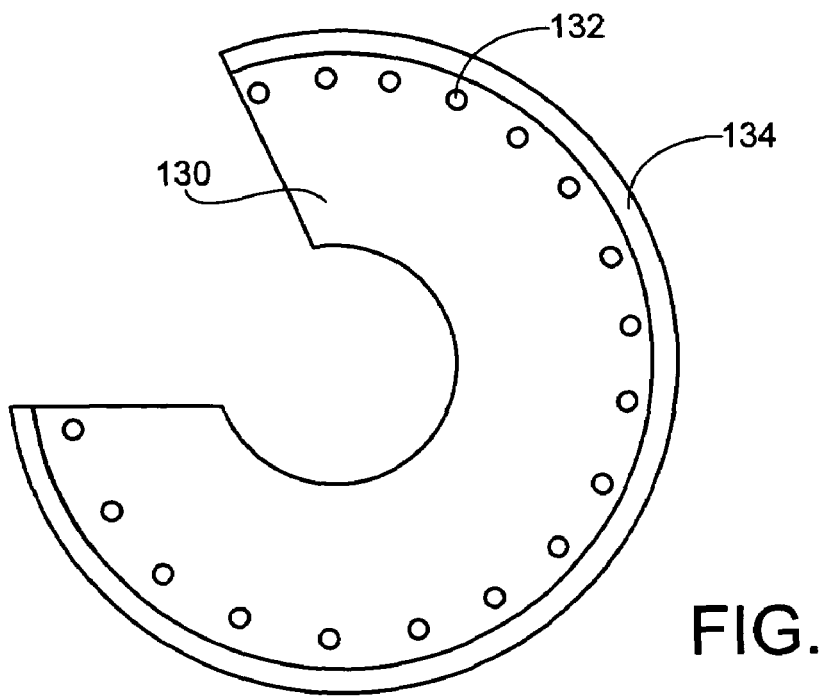
FIG. 5 provides a top plan view of an alternative windage plate.
Figure 6:
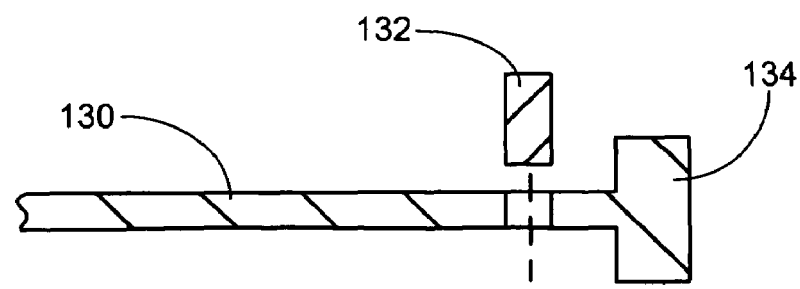
FIGS. 6-8 illustrate alternative preferred constructions for the windage plate of FIG. 5.
Figure 7:
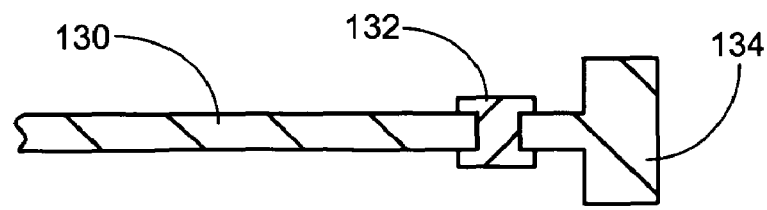
Figure 8:
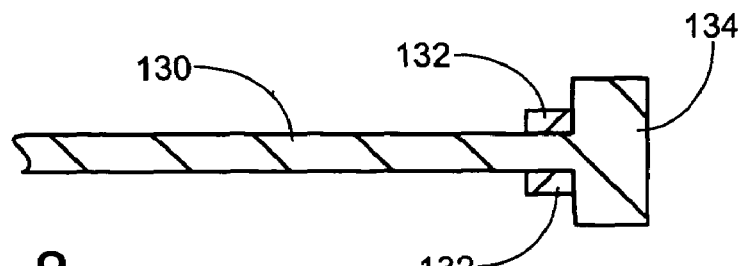

FIG. 5 illustrates an alternative construction for the plate 130 in which the snubber members comprises a plurality of discrete members arrayed adjacent an outermost diameter (OD) of the discs 108. The snubber members 132 can each be heat staked, molded or pressed through an aperture in the plate 130, as depicted by FIGS. 6 and 7. The snubber members 132 can also be affixed to the surface of the plate 130 using adhesive or a form in place gasket (FIPG) approach, such as depicted by FIG. 8. While the discrete snubbers 132 of FIGS. 5-8 are shown to have a circular shape, other shapes, including one continuous circumferentially extending bead, can be used as desired depending on the requirements of a given application.

Figure 9:
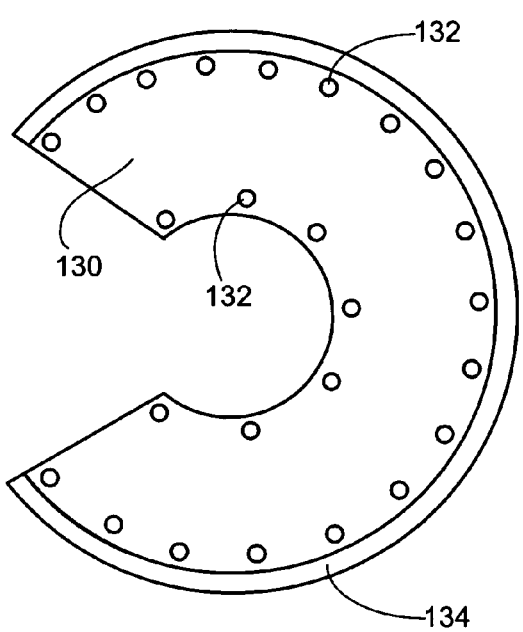
FIG. 9 provides another alternative windage plate construction with the snubber members located at both an innermost diameter (ID) and an outermost diameter (OD) of the discs.

FIG. 9 provides another alternative construction for the plate 130 in which the snubber members 130 are provided near both the innermost diameter (ID) and the OD of the discs 108. In a related embodiment, the snubber members 132 are only placed near the ID, and the snubber members adjacent the OD are omitted. Generally, the optimal placement of the snubber members 132 will depend at least in part upon the relative thicknesses, mass and material constructions of the discs 108 and plates 130.

Figure 10:
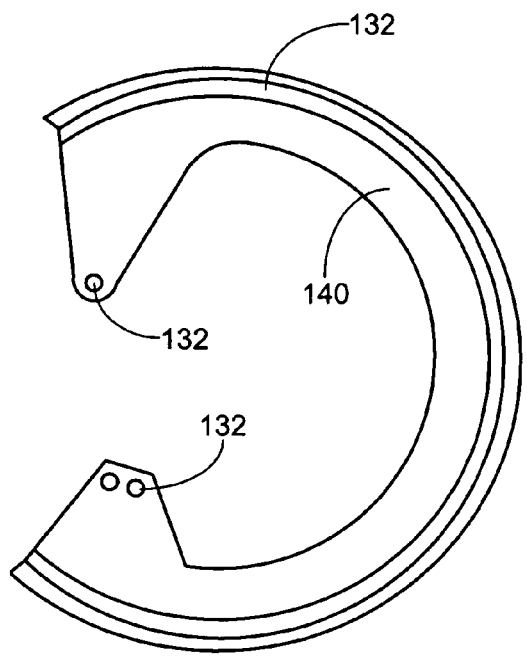
FIGS. 10 and 11 illustrate other alternative windage plates configured to reduce vibrations (non-repeatable runout, NRRO) established by rotation of the disc assembly.
Figure 11:
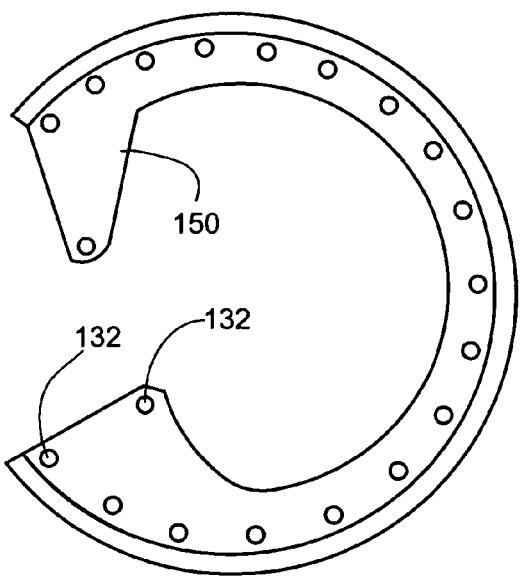

FIGS. 10 and 11 provide alternative constructions for the plates, denoted herein numerically at 140 and 150, respectively. Instead of providing substantially complete coverage of the associated disc surface as with the previously discussed embodiments, the plates 140, 150 provide a substantial, albeit reduced, coverage area. The plates are further specially configured to reduce the effects of vibrations (non-repeatable runout, NRRO) established by the disc assembly 122. It will be noted that the plates 140, 150 nevertheless still circumferentially extend adjacent the associated disc surfaces as before. It will also be noted that the OD snubber member 132 for the plate 150 in FIG. 11 comprises a single, continuous bead of material.

Returning briefly to FIG. 1, the plates 130, 140, 150 are each preferably supplied with a leading edge 160 (downstream from the heads 112) and a trailing edge 162 (upstream from the heads 112). The edges 160, 162 serve to define an access opening to permit the actuator assembly 110 to move the heads 112 across the disc surfaces.

Figure 12:
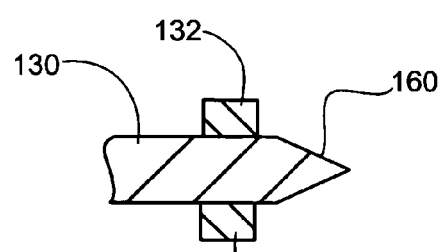
FIG. 12 depicts a leading edge of the plate 130 which tapers substantially to a point and a localized snubber member which prevents contact between the leading edge and the associated disc surface.
Figure 13:
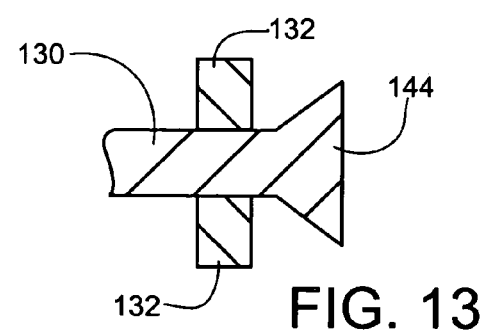
FIG. 13 depicts a leading edge of the plate 130 with an air dam which comprises a localized increase in thickness of the plate to further direct the fluidic flow, and and a localized snubber member which prevents contact between the air dam and the associated disc surface.

The respective leading and trailing edges 160, 162 can be additionally configured as desired to further direct the fluidic currents 114. For example, FIG. 12 provides an exemplary leading edge 160 for the plate 130 with a reduced thickness that substantially tapers to a point to enhance laminar flow in the fluidic currents. FIG. 13 provides an exemplary leading edge 160 for the plate 130 with an air dam, comprising a localized increase in thickness of the plate material as compared to remaining portions of the plate to equalize or reduce the pressure drop in the vicinity of the heads 112. It will be noted from FIGS. 12 and 13 that the snubber members 128 are preferably configured to limit or prevent contact between the leading and trailing edges 160, 162 and the discs 108 irrespective of the particular configurations of such edges.

FIGS. 14 and 15 provide yet additional alternative embodiments for the plates 130 in which the snubber members 132 comprise continuous beads, or ridges, that extend radially across the disc surfaces from OD to ID. That is, each snubber member 132 lies generally transverse to the direction of the fluidic currents 114 and includes a proximal end adjacent the disc OD and a distal end adjacent the disc ID. Radially extending the snubber members 132 in this way alters the fluidic drag encountered by the spindle motor 106 and further directs the fluidic flow as desired.

FIG. 16 provides another alternative embodiment for a selected plate 130. An inwardly directed protrusion 164 near the disc ID extends into an annular channel 166 formed in a disc spacer assembly 168. The protrusion 164 and channel 166 cooperate to provide a circumferentially extending snubber member to limit deflection of the plate 130 at the disc ID, thereby preventing contact between the discs 108 and plate 130. The configuration of FIG. 16 advantageously "secures" the otherwise inwardly cantilevered plate 130 during shock events.

It will be noted that the foregoing embodiments provide certain advantages over the prior art. The windage plates are easily manufactured and readily installed in automated manufacturing environments. The snubber members operate to advantageously limit deflection of the discs and/or plates in response to application of a mechanical shock, thereby reducing the potential for damage or particulation that could adversely affect the reliability of the device.

The snubber members further advantageously accommodate a wide range of alternative constructions for the windage plates, including lower mass, higher flexibility plates, plates that are closer in proximity to the associated disc surfaces, and plates with different elevational features including higher thickness air dams.

While the foregoing embodiments are directed to a data storage environment, such is not limiting. Rather, the claimed invention can be utilized in any number of other applications such as, but not limited to, a rotatable color wheel in a video projection system, a rotatable sensor plate for a mechanically rotated element such as an antenna, a fluidic rotor in a pump or turbine system, etc.

In view of the foregoing, it will now be understood that the present invention, as embodied herein and as claimed below, is generally directed to an apparatus for providing enhanced fluidic control.

In accordance with some preferred embodiments, the apparatus comprises a circumferentially extending windage plate (such as 130, 140, 150) adapted for placement adjacent a rotatable disc surface (such as 108) to direct fluidic currents (such as 114) established by rotation of said surface, and a snubber member (such as 132, 164, 166) supported by the plate to prevent localized contact between the plate and the surface as a result of deflection induced by application of a mechanical shock.

In other preferred embodiments, the apparatus comprises an access element (such as 112) moveable along a movement path adjacent a rotatable surface (such as 108), a circumferentially extending windage plate which directs fluidic currents established by rotation of said surface, and a snubber member (such as 132, 164, 166) supported by the plate which prevents localized contact between the plate and the surface upon deflection thereof in response to application of a mechanical shock. Preferably, the rotatable surface comprises a data recording surface and the access element comprises a data transducing head.

For purposes of the appended claims, the recited "first means" will be understood to correspond to the disclosed snubber members 128 of FIGS. 2-15 and the protrusion/channel combination 164, 166 of FIG. 16, which operate to prevent contact between the plates 130, 140, 150 and the discs 108. An air dam (as shown for example in FIG. 13) which comprises a localized increased thickness in the plate at the leading or trailing edge of the plate, irrespective whether the air dam is the same or a different material from remaining portions of the plate, is excluded from the scope and range of equivalents of this first means element since the first means prevents contact between such an air dam and the associated disc as well, as explained above.

Moreover, the use of the term "windage" will be defined broadly and will not be limited to atmospheric air, but rather includes any number of other fluids such as inert gasses, pressurized fluids, steam, liquids, etc. The term "plate" will be defined to describe a member with a facing surface having an area that is at least 50% of a corresponding surface area of the disc, as depicted in the appended drawings.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. An apparatus comprising:
a circumferentially extending windage plate adapted for placement adjacent a rotatable disc surface to direct fluridic currents established by rotation of said surface; and
a snubber member supported by the plate to prevent localized contact between the plate and the surface upon deflection thereof in response to application of a mechanical shock,
wherein the rotatable disc surface is disposed on a disc having outermost perimeter surface, and wherein the apparatus further comprises shroud surface which depends from the plate and extends adjacent said outermost perimeter surface.

2. The apparatus of claim 1, wherein the windage plate is configured coaxially adjacent and substantially parallel to said rotatable disc surface.

3. The apparatus of claim 1, wherein the rotatable surface is characterized as a recording surface of a data recording disc, the apparatus further comprising a data transducing head in communication with the data recording disc wherein the directed fluidic currents support the data transducing head.

4. The apparatus of claim 1, wherein the snubber member comprises an elastomeric material which contactingly engages the rotatable surface to limit deflection thereof.

5. The apparatus of claim 1, wherein the snubber member is disposed adjacent an outermost diameter of the disc surface to limit deflection of said outermost diameter.

6. The apparatus of claim 1, wherein the snubber member is disposed adjacent an innermost diameter of the disc surface to limit deflection of said innermost diameter.

7. The apparatus of claim 1, wherein the plate comprises a disc shaped cantilevered member which projects inwardly adjacent the disc surface from an outermost diameter to an innermost diameter of said surface, and wherein the snubber member comprises a protrusion which projects into a channel adjacent the rotatable surface to limit deflection of the plate near the surface innermost diameter.

8. The apparatus of claim 1, wherein the plate is further configured to reduce vibrations established during rotation of said surface.

9. The apparatus of claim 1, wherein the snubber member comprises a plurality of ridges each projecting substantially toward the rotatable disc surface and radially extending across said surface from a proximal end adjacent an outermost diameter of said surface to a distal end adjacent an innermost diameter of said surface.

10. The apparatus of claim 1, wherein the plate comprises a leading edge and a trailing edge to define an access opening to permit an access element to radialiy move across said surface, wherein at least a selected one of the leading edge and the trailing edge comprises an air dam comprising a localized thickness of the plate greater than a thickness of remaining portions of the plate, and wherein the snubber member prevents contact between the air dam and said surface.

11. An apparatus, comprising:
an access element moveable along a movement path adjacent a rotatable surface;
a circumiferentially extending windage plate which directs fluidic currents established by rotation of said surface; and
a snubber member supported by the plate which prevents localized contact between the plate and the surface upon deflection thereof in response to application of a mechanical shocks,
wherein the snubber member is characterized as one of a plurality of snubber members supported by the plate, and
wherein the plurality of snubber members comprise radially extending ridges that span the plate each having a proximal end adjacent an outermost diameter of the rotatable surface and a distal end adjacent an innermost diameter of the rotatable surface.

12. The apparatus of claim 11, wherein the windage plate comprises a leading edge and a trailing edge to define an access opening to permit the access element to radially move across said surface, wherein at least a selected one of the leading edge and the trailing edge comprises an air darn comprising a localized thickness of the plate greater than a thickness of remaining portions of the plate, and wherein the snubber member prevents contact between the air dam and said surface.

13. The apparatus of claim 11, wherein the plurality of snubber members circumferentially extend around the plate adjacent an outermost diameter of the roatable surface.

14. The apparatus of claim 11, wherein the access element comprises a data transducer and wherein the rotatable surface is characterized as a recording surface of a data storage disc.

15. An apparatus, comprising:
   an access element moveable along a movement path adjacent a rotatable surface;
   a circumferentially extended windage plate which directs fluidic currents established by rotation of said surface; and
   first means for preventing localized contact between the surface and the plate in response to application of a mechanical shock,
   wherein the windage plate comprises a leading edge and a trailing edge to define an access opening to permit the access element to radially move across said surface, wherein at least a selected one of the leading edge and the trailing edge comprises an air dam comprising a localized thickness of the plate greater than a thickness of remaining portions of the plate, and wherein the first means prevents contact between the air dam and said surface.

16. The apparatus of claim 15, wherein the access element comprises a data transducer and wherein the rotatable surface is characterized as a recording surface of a data storage disc.

17. An apparatus comprising:
   a circumferentially extending windage plate adapted for placement adjacent a rotatable disc surface to direct fluidic currents established by rotation of said surface; and
   a snubber member supported by the plate to prevent localized contact between the plate and the surface upon deflection thereof in response to application of a mechanical shock,
   wherein the plate comprises a disc shaped cantilevered member which projects inwardly adjacent the disc surface from an outermost diameter to an innermost diameter of said surface, and wherein the snubber member comprises a protrusion which projects into a channel adjacent the rotatable surface to limit deflection of the plate near the surface innermost diameter.

18. An apparatus comprising:
   a circumferentially extending windage plate adapted for placement adjacent a rotatable disc surface to direct fluidic currents established by rotation of said surface; and
   a snubber member supported by the plate to prevent localized contact between the plate and the surface upon deflection thereof in response to application of a mechanical shock,
   wherein the snubber member is disposed adjacent an innermost diameter of the disc surface to limit deflection of said innermost diameter.

19. The apparatus of claim 18, wherein the snubber member comprises an elastomeric material which contactingly engages the rotatable surface to limit deflection thereof.

20. The apparatus of claim 18, wherein the rotatable surface is characterized as a recording surface of a data recording disc, the apparatus further comprising a data transducing head in communication with the data recording disc, wherein the directed fluidic currents support the data transducing head.

* * * * *